United States Patent [19]

McGirr

[11] Patent Number: 4,607,875

[45] Date of Patent: Aug. 26, 1986

[54] DETACHABLE SUNSCREEN FOR VEHICLE WINDOWS

[76] Inventor: Kermit L. McGirr, 6243 S. 4th Ave., Phoenix, Ariz. 85041

[21] Appl. No.: 679,891

[22] Filed: Dec. 10, 1984

[51] Int. Cl.$^4$ .............................................. B60J 1/20
[52] U.S. Cl. ............................... 296/97 D; 296/97 R; 248/205.5; 248/205.9; 248/362
[58] Field of Search ................ 296/97 R, 97 D, 97 F, 296/95 R, 95 Q, 95 C, 97 A; 160/DIG. 2, DIG. 3, 368 S; 248/205.9, 205.5, 205.7, 205.8, 206.2, 309.3, 362; 251/339; 215/262; 220/331, DIG. 19

[56] References Cited

U.S. PATENT DOCUMENTS

| | | | |
|---|---|---|---|
| 3,107,829 | 10/1963 | Makowski | 222/525 |
| 3,276,640 | 10/1966 | Kessler | 222/546 X |
| 3,338,293 | 8/1967 | Hohmann | 160/368 |
| 3,442,476 | 5/1969 | Trimble | 248/205.9 X |
| 3,649,069 | 3/1972 | Zip | 248/205.9 |
| 3,751,100 | 8/1973 | Keyes | 296/95 C |
| 3,878,573 | 4/1975 | Boudewyn | 248/362 X |
| 4,109,957 | 8/1978 | Polizzi et al. | 296/95 C |
| 4,172,613 | 10/1979 | Furando | |
| 4,261,649 | 4/1981 | Richard | 296/97 F |
| 4,399,347 | 8/1983 | Schmitt | 296/97 D |

Primary Examiner—Robert B. Reeves
Assistant Examiner—Russell D. Stormer
Attorney, Agent, or Firm—James H. Phillips; Charles E. Cates

[57] ABSTRACT

In order to provide a readily detachable sunscreen for any window, including the windshield, of a vehicle such as an airplane, car, or truck, a sheet of perforated mylar, preferably having a reflective coating on its outwardly facing surface, is integrated with a plurality of suction cup assemblies which are employed to attach the sunscreen to the interior surface of the window such that the mylar sheet is disposed closely spaced from and generally parallel to the surface. The suction cup assemblies include integral means for quickly and easily relieving the interior vacuum of the suction cups to permit easy removal of the sunscreen. The short edges of the sunscreen are reinforced with rigid strips to facilitate rolling the removed sunscreen into a convenient generally cylindrical package for temporary storage.

13 Claims, 8 Drawing Figures

U.S. Patent  Aug. 26, 1986  4,607,875
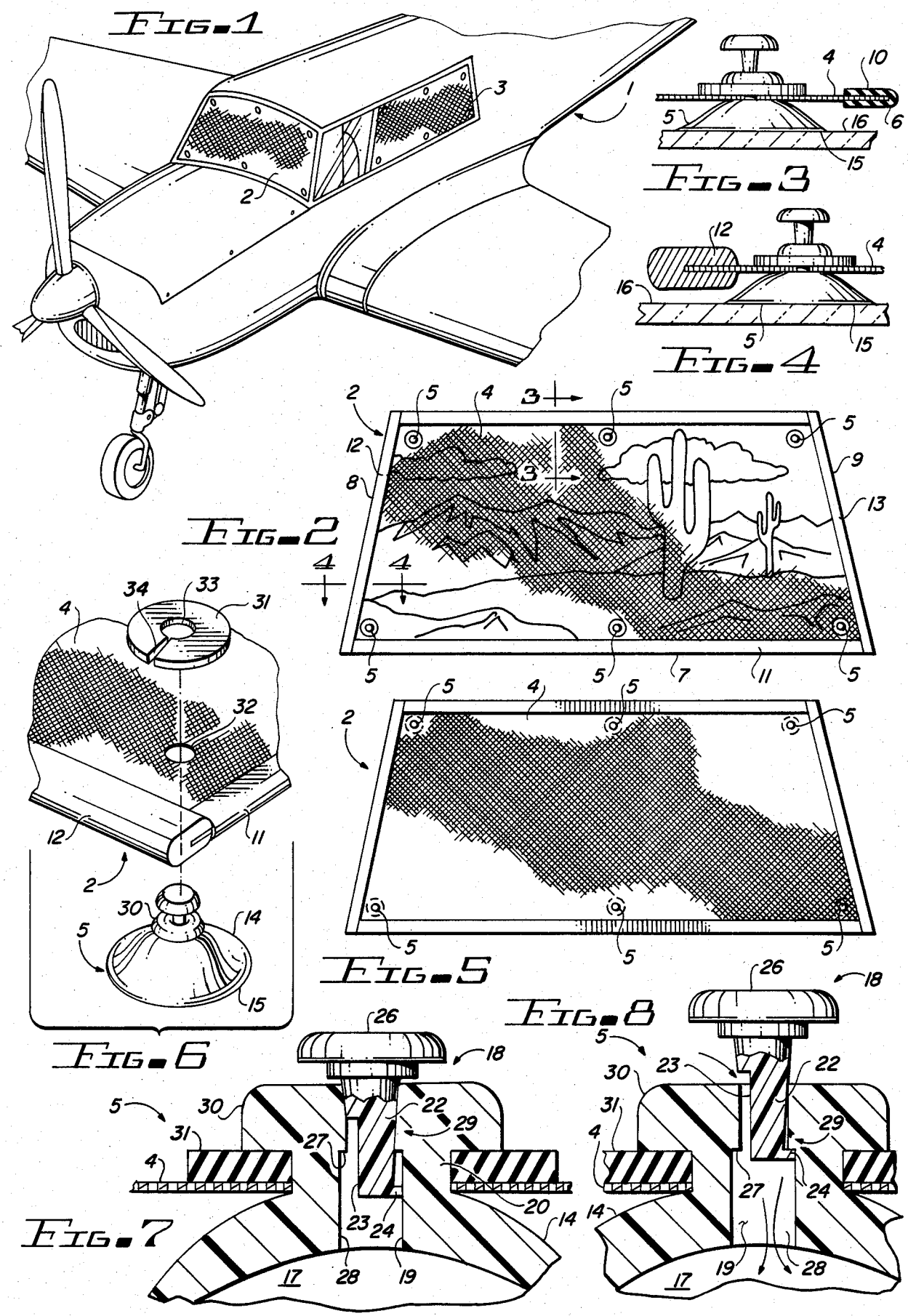

4,607,875

DETACHABLE SUNSCREEN FOR VEHICLE WINDOWS

BACKGROUND OF THE INVENTION

This invention relates to the vehicle arts, and more particularly, to means for providing a readily detachable sunscreen for the interior surface of any window or windshield in a vehicle.

The effect of the sun in drastically raising the interior temperature of vehicles (including cars, trucks, and airplanes) parked outdoors is notoriously well known, particularly as it occurs during the summer in hotter geographical regions such as the southwestern United States. The oven effect causes the interior of vehicles exposed to such intense sun light to reach temperatures which may approach 200 degrees F. In addition to being extremely uncomfortable to passengers and the operator entering a vehicle which has been so exposed, the controls become so hot as to be virtually impossible to touch until the interior has been somehow cooled with a consequent cooling of the controls. Further, extended periods of high interior temperature have a decidely deleterious effect on the interior materials such as upholstery, and also on the vehicle control and information display systems. In particular, the reliability and life of certain electronic components are radically adversely affected by extended exposure to high temperatures. Still further the direct exposure of materials used in vehicle interiors (such as vinyl, cloth, etc.) to the ultraviolet spectral components of intense sunlight for extended periods results in early deterioration of such materials.

To minimize interior heating and the effects of such long term exposure to intense sunlight, sunscreens have been devised for permanent installation in the rear, and in some instances the side, windows of vehicles subject to exposure. These sunscreens typically consist of perforated metal or perforated plastic sheets which are custom configured for a given window in a rigid structure. The perforated plastic material may be provided, on its outside face, with a reflective, and sometimes decorative, coating to redirect a substantial percentage of the sun's rays back through the window glass, thus correspondingly decreasing the heating effect and ultraviolet ray bombardment which would be experienced through the window if it were unshielded.

However, the total effectiveness of the shielding system is manifestly reduced by the fact that only a portion of the total vehicle window area is treated; i.e., there is no sun shield provided for the windshield, which may have the largest area of the several vehicle windows, and the use of such sunscreens for the side windows (and even rear windows) may be limited by legal visibility requirements mandated by the vehicle licensing authority. In particular, the visibility requirements for aircraft are such that no sunscreens which would in any way limit the pilot's visibility are permitted to remain in place during aircraft operation.

It has been proposed in the prior art to provide sunscreens for vehicle windshields which are not permanently attached, but which may be removed during vehicle operation. However, these prior art attempts at providing a readily removable sunscreen for the interior of a vehicle have been characterized by detachable affixing means which were impractically difficult to manipulate and were unreliable and uncertain in operation, typically requiring permanently affixing one element of a two-piece fastening structure (such as hook and loop, snap and suction cup, etc.) to the window surface. The permanently affixed fastening elements are not only unsightly but may also be unacceptable in such applications as the windshield of an aircraft.

Thus, those skilled in the art will appreciate that it would be highly desirable to provide an effective sunscreen for any window, including the windshield of any vehicle, including aircraft, in such a manner that the entire sunscreen structure may be easily and completely mounted and demounted for alternative use and storage during vehicle operation.

OBJECTS OF THE INVENTION

It is therefore a broad object of my invention to provide a readily mountable and demountable sunscreen which may be employed with any window, including the windshield, of a vehicle.

It is another object of my invention to provide such a sunscreen which is a unitary structure and requires no mating affixing means which must be permanently mounted on the window or windshield.

In a more specific aspect, it is an object of my invention to provide a sunscreen assembly which employs suction cup affixing means including means for readily releasing the suction cups from the window or windshield when the sunscreen is to be removed.

In another aspect, it is an object of my invention to provide a suction cup assembly which includes integral means for relieving the chamber partial vacuum, thereby facilitating removal of the suction cup from a surface to which it has been attached.

SUMMARY OF THE INVENTION

These and other objects of my invention are achieved by utilizing a sunscreen material, such as perforated mylar coated on its exterior surface with a sun reflecting medium, in a structure which is removably positionable on the interior surface of a vehicle window by means of a series of suction cup assemblies of unique configuration. The suction cup assemblies are characterized by the provision of integral means for quickly and easily relieving the interior vacuum of the suction cups to facilitate removal and storage of the sunscreen.

In a preferred embodiment, the means for relieving the interior vacuum of the suction cup include a centrally disposed sliding valve which may be moved by axial translation between alternative suction-holding and vacuum-release positions. The axially translatable member of the valve structure is generally conical and includes a relieved portion along a lower portion of its length. When the axially translatable member is pushed into a first position, there is no communication path between the interior of the suction cup and the atmosphere such that secure attachment to the window is achieved. When the axially translatable member is pulled into an alternative position, the relieved portion establishes a communications path between the suction cup interior and the atmosphere such that the vacuum is immediately relieved, thereby permitting the suction cup assembly to be withdrawn from the window or windshield.

Preferably, the entire sunscreen structure is generally configured to the shape of a window or windshield with which it is to be employed in order to achieve maximum shielding effect. To facilitate storage, I prefer to provide, along the short edges of the sunscreen, a rigid reinforcing material, such as wood, whereby the removed sunscreen may be rolled up for a compact, generally cylindrical, storage package. For most vehicle windows and windshields, the sunscreen assembly, when fitted, is generally trapezoidal in shape. Others may be rectangular, and an assorted series of general purpose (rather than custom fitted) rectangular assemblies, from which a good fit for a given window may be achieved, are contemplated.

DESCRIPTION OF THE DRAWING

The subject matter of the invention is particularly pointed out and distinctly claimed in the concluding portion of the specification. The invention, however, both as to organization and method of operation, may best be understood th reference to the following detailed description taken with reference to the accompanying drawing of which:

FIG. 1 is a partial view of an aircraft vehicle illustrating one important application of the present invention;

FIG. 2 is a plan view, from the exterior side, of a sunscreen according to the present invention;

FIG. 3 is a partial view taken along the lines 3—3 of FIG. 2 and particularly illustrating the disposition of the special suction cup attachment means employed with the sunscreen;

FIG. 4 is a view similar to FIG. 3 taken along the lines 4—4 of FIG. 2 and also illustrates the rigid support means preferably employed along the shorter sides of a sunscreen in accordance with the present invention;

FIG. 5 is a plan view from the interior side of the sunscreen illustrated in FIG. 2;

FIG. 6 is a partially exploded view of a suction cup assembly situated at one corner of the sunscreen illustrated in FIGS. 2 and 5 particularly showing one means for incorporating a suction cup assembly into the sunscreen structure;

FIG. 7 is a partial cross-sectional view of a suction cup assembly of the invention affixed to a surface and illustrated with its control element pushed into a first, suction-holding position; and FIG. 8 is a view similar to FIG. 7 illustrating the suction cup assembly with its control element pulled to an alternative, vacuum-release position which permits removing the suction cup assembly from the surface to which it has been engaged.

DETAILED DESCRIPTION OF THE INVENTION

Referring now to FIG. 1, there is illustrated an aircraft 1 which serves as an exemplary vehicle with which the sunscreen, with its readily demountable suction cup attachment means, may be used. It will specifically be understood by those skilled in the art that the aircraft 1 is only exemplary and that the sunscreen (including its suction cup assembly) of the present invention enjoys equally advantageous use in other vehicles such as automobiles and trucks. A first sunscreen 2 is illustrated affixed in position on the interior surface of the airplane's windshield. Similarly a second sunscreen 3 is illustrated as attached to the interior surface of the aircraft side window in view in FIG. 1.

In FIG. 1, the sunscreens 2, 3 are each configured generally to conform to the interior shape and contour of the surface to which they are to be affixed. It will be understood that the sunscreens can be custom configured to a specific window or fabricated in a range of shapes and sizes from which particular examples may be selected for semicustom installation. The principal advantages of custom fitting are that light "leaks" around the edges are substantially reduced and the appearance is more satisfactory. It will be appreciated, however, that effective shielding is achieved if most of the glass area is covered.

FIG. 2 is a plan view of the outboard surface of the sunscreen 2 installed in closely spaced, generally parallel, relationship to the interior surface of the windshield of the airplane 1 illustrated in FIG. 1. The shielding material 4 of the sunscreen 2 may be opaque, translucent (but transmitting less than all the light impinging thereon), or, preferably, opaque with perforations of such area compared to the unperforated area that effective shielding is achieved while still permitting a vehicle operator and passengers to have appreciable vision from within the vehicle with the sunscreen 2 in place.

More particularly, in the presently preferred embodiment of the sunscreen, the material 4 is a thin, opaque plastic sheet provided with a myriad of regularly spaced perforations. One material which provides excellent results is perforated mylar provided with a reflective coating on one surface which may be disposed outwardly toward the window surface to intercept the sun's rays. Such material is commonly available and in wide use in the permanently installed sunscreens often used in the rear windows of automobiles and trucks. If desired, an ornamental design may be applied to the outer surface of the material 4 as shown in FIG. 2 by silkscreen or other applicable technique.

As will be discussed more fully below, the sunscreen 2 is removeably secured in place in closely spaced, generally parallel, relationship to the interior surface of the vehicle windshield by a plurality of suction cup assemblies 5. Each suction cup assembly 5 is characterized by a quick release feature which serves to admit atmosphere into the chamber defined by the suction cup and windshield surface, thereby facilitating removal of the sunscreen 2 for storage during vehicle operation.

The trapezoidal shape of the sunscreen 2 illustrated in FIG. 2 is typical of those custom or semi-custom fitted to windshields or other vehicle windows. Thus, the shape is characterized by long sides 6, 7 and short sides 8, 9. Referring to FIG. 3 as well as FIG. 2, the long sides 6, 7 are preferably provided with a reinforcing flexible material 10, 11 along the respective side edges. The reinforcing strips 10, 11 may be of any suitable material, such as vinyl or rubber, and serve to insure the longevity of the sunscreen 2 by minimizing fraying and like edge deterioration which could result from repeated storage and use cycles.

Referring now to FIG. 4 as well as FIG. 2, the short sides 8, 9 are preferably reinforced at their respective edges with rigid elongate structures 12, 13 which may comprise, by way of example, wood strips. It has been found that provision of the rigid edge reinforcing means 12, 13 on the short sunscreen sides facilitates not only performing attachment and detachment of the sunscreen to the windshield or other window, but also rolling the sunscreen 2 into a generally cylindrical bundle for efficient temporary or prolonged storage in the vehicle. Of course, it will be obvious that the flexible reinforcing strips could be placed on the short side and the rigid reinforcing strips on the long sides; however, the previously described alternative is usually preferable because a shorter storage bundle results.

Attention is now directed to FIGS. 7 and 8 from which the structure and operation of the suction cup assembly 5 may best be appreciated. The suction cup assembly 5 includes a bell portion 14 having a concave inner surface bounded by planar circumferential lips 15 (see FIGS. 3, 4 and 6) which are adapted to sealingly engage a smooth surface 16. The smooth surface 16 may be, by way of example only, the interior surface of a window or windshield. A chamber 17, defined by the interior surface of the bell portion 14 and the surface 16, is selectively sealed off according to the position of an axially translatable stopper member 18. Axially translatable stopper member 18 is captured within an aperture 19 which is centrally positioned in a neck section 20 which, in turn, is symmetrically disposed with respect to (and extending away from) the open end of the bell portion 14.

The aperture 19 through the neck section 20 is generally cylindrical along its length, but is resiliently deformable such that a tapered portion 22 of the stem 29 of the stopper member 18 closely and sealingly engages the upper region of the aperture 19 when the stopper member 18 is pushed into the suction-holding position depicted in FIG. 7. The remainder of the stem 29 of the stopper member 18 extending toward the chamber 17 is provided with a relieved or cutaway area 23, and the end of the stopper member 18 toward the chamber 17 terminates in a radially extending finger 24.

Thus, when downward pressure is applied to the cap 26 of the stopper member 18, the tapered portion 22 of the stem 29 forceably slightly deforms the inner surface of the upper region of the aperture 19 to achieve the above-mentioned seal. Simultaneously, air is expelled from the interface between the lips 15 and the smooth surface 16, thereby creating a sub-atmospheric condition in the chamber 17. The seal provided by the close engagement of the deformed portion of the aperture 19 and the tapered portion 22 of the stopper member 18, in conjunction with the natural atmospheric force applied to the exposed portion of the stopper member 18, serves to provide an effective total seal by which the suction cup assembly 5 is securely affixed to the surface 16.

When it is desired to remove the suction cup assembly 5 from the surface 16, the cap 26 of the stopper member 18 is grasped and pulled outwardly to the position depicted in FIG. 8. The outward travel of the stopper member 18 is limited by the engagement of the finger 24 with a shoulder 27 defined by the termination of an enlarged radius lower region 28 of the aperture 19. As the stopper member 18 moves toward and into the position shown in FIG. 8, air at atmospheric pressure is admitted into the chamber 17 through the aperture 19 along a passage defined by the relieved portion 23 of the stem of the stopper member 18. As a result, the chamber 17 immediately assumes atmospheric pressure whereby the suction cup assembly is released and may simply be lifted away from the surface 16.

While the suction cup assembly 5 may be secured to the material 4 of the sunscreen 2 in any suitable fashion, a presently preferred securement can best be understood by reference to FIG. 6 as well as FIGS. 7 and 8. Bell portion 14 of the suction cup assembly 5 includes, at the top of neck section 20, a radially outwardly extending circumferential shoulder 30 sized and configured to engage and hold a resilient ring member 31 having a central aperture 33. The circumferential shoulder 30 is inserted through an aperture 32 provided through the material 4, and the ring 31 is forced over the circumferential shoulder 30 to assume the installed position (shown in FIGS. 7 and 8) between the material 4 and the underside of the circumferential shoulder 30. The ease with which this installation operation is carried out may be facilitated by providing, in the ring member 31, a radial slot 34 extending between the central aperture 33 and the outer circumference of the ring member 31.

The materials from which the components of the suction cup assembly 5 may be fabricated are diverse. The bell portion 14 should be sufficiently resilient and soft in the region of the lips 15 as to insure a good seal against the surface 16. The stopper member 18 should be elastic, but sufficiently stiff as to deform and attain proper engagement with the upper region of the aperture 19 in the suction-holding position and between the finger 24 and the shoulder 27 in the vacuum-release position. However, it should not be so stiff as to make initial assembly of the stopper member 18 into the aperture 19 (readily achieved by simply pushing the stopper member into the aperture until the finger 24 snaps past the shoulder 27) difficult or subject to damaging the interior walls of the aperture. Generally, the stopper member 18 should be fabricated from a somewhat harder substance than the bell portion 14. The ring member 31 may comprise a material similar to that used to fabricate the stopper member 18.

While the principals of the invention have now been made clear in an illustrative embodiment, there will be immediately obvious to those skilled in the art many modifications of structure, arrangement, components and materials used in the practice of the invention which are particularly adapted for specific environments and operating requirements without departing from those principals.

I claim:
1. A readily detachable sunscreen for a windshield or other window of a vehicle comprising:
   A. a sheet of sunscreen material dimensioned and configured to conform to the contour and shape of the window or window portion to be shielded; and
   B. a plurality of suction cup assemblies fixed to and distributed about said sheet of sunscreen material for engaging and sticking to a surface of the window, thereby supporting said sheet of sunscreen material on the window in generally parallel relationship thereto;
   C. each of said suction cup assemblies comprising:
      1. a flexible bell portion having a concave inner surface and an opening bounded by circumferential lips adapted to conform to and sealingly engage said window surface and therewith define a cavity, said bell portion further having a neck portion extending axially away from the plane defined by said lips, said neck portion having a generally cylindrical axial aperture passing therethrough, said axial aperture comprising:
         a. a resiliently deformable upper aperture region;
         b. a lower aperture region coaxial with said upper aperture region;
            i. said lower aperture region being of larger radius than said upper aperture region and opening into said cavity; and
         c. a shoulder defined by the junction of said upper and lower aperture regions;
      2. a stopper member disposed in said axial aperture and adapted for axial translation between first and second terminal positions;
         a. said stopper member being dimensioned and downwardly tapered along an upper portion of its length to closely engage and slightly deform said upper aperture region when disposed in said first terminal position to thereby seal off said cavity such that a suction may be maintained in said cavity when said lips sealingly engage said window surface;

b. said stopper member having a relieved region along a lower portion of its length providing clearance between said stopper member and said upper aperture region, said lower portion being disposed closer to said opening than said first portion and being dimensioned and configured such that, when said stopper member is in said second terminal position, a communications path is established through said axial aperture to place said cavity at atmospheric pressure, thereby releasing said suction cup assembly from said window surface; and c. said stopper member including a finger projecting outwardly from said lower portion and adapted to engage said shoulder when said stopper member is in said second terminal position, thereby limiting the axial translation of said stopper member and retaining said stopper member in said axial aperture.

2. The detachable sunscreen of claim 1 in which said sunscreen material comprises a perforated plastic.

3. The detachable sunscreen of claim 2 in which said sunscreen material is provided with a reflective coating on at least one side thereof.

4. The detachable sunscreen of claim 3 in which said sunscreen material comprises mylar.

5. The detachable sunscreen of claim 1 in which said sunscreen has a pair of opposing short sides and a pair of opposing long sides, each side of one pair being provided with stiff edge reinforcing means to facilitate rolling said sunscreen into a generally cylindrical bundle for storage.

6. The detachable sunscreen of claim 2 in which said sunscreen has a pair of opposing short sides and a pair of opposing long sides, each side of one pair being provided with stiff edge reinforcing means to facilitate rolling said sunscreen into a generally cylindrical bundle for storage.

7. The detachable sunscreen of claim 3 in which said sunscreen has a pair of opposing short sides and a pair of opposing long sides, each side of one pair being provided with stiff edge reinforcing means to facilitate rolling said sunscreen into a generally cylindrical bundle for storage.

8. The detachable sunscreen of claim 4 in which said sunscreen has a pair of opposing short sides and a pair of opposing long sides, each side of one pair being provided with stiff edge reinforcing means to facilitate rolling said sunscreen into a generally cylindrical bundle for storage.

9. The detachable sunscreen of claim 5 in which each side of the remaining pair is provided with flexible reinforcement means to minimize edge damage.

10. The detachable sunscreen of claim 6 in which each side of the remaining pair is provided with flexible reinforcement means to minimize edge damage.

11. The detachable sunscreen of claim 7 in which each side of the remaining pair is provided with flexible reinforcement means to minimize edge damage.

12. The detachable sunscreen of claim 8 in which each side of the remaining pair is provided with flexible reinforcement means to minimize edge damage.

13. A suction cup assembly comprising:

A. a flexible bell portion having a concave inner surface and an opening bounded by circumferential lips adapted to conform to and sealingly engage a smooth surface and therewith define a cavity, said bell portion further having a neck portion extending axially away from the plane defined by said lips, said neck portion having a generally cylindrical axial aperture passing therethrough, said axial aperture comprising:
   1. a resiliently deformable upper aperture region;
   2. a lower aperture region coaxial with said upper aperture region;
      a. said lower aperture region being of larger radius than said upper aperture region and opening into said cavity; and
   3. a shoulder defined by the junction of said upper and lower aperture regions;

B. a stopper member disposed in said axial aperture and adapted for axial translation between first and second terminal positions;
   1. said stopper member being dimensioned and downwardly tapered along an upper portion of its length to closely engage and slightly deform said upper aperture region when disposed in said first terminal position to thereby seal off said cavity such that a suction may be maintained in said cavity when said lips sealingly engage said smooth surface;
   2. said stopper member having a relieved region along a lower portion of its length providing clearance between said stopper member and said upper aperture region, said lower portion being disposed closer to said opening than said first portion and being dimensioned and configured such that, when said stopper member is in said second terminal position, a communications path is established through said axial aperture to place said cavity at atmospheric pressure, thereby releasing said suction cup assembly from said smooth surface; and
   3. said stopper member including a finger projecting outwardly from said lower portion and adapted to engage said shoulder when said stopper member is in said second terminal position, thereby limiting the axial translation of said stopper member and retaining said stopper member in said axial aperture.

* * * * *